United States Patent Office 3,250,592
Patented May 10, 1966

3,250,592
PRODUCTION AND RECOVERY OF
BERYLLIUM CHLORIDE
Ricardo O. Bach, Gastonia, N.C., assignor to Beryllium
Metals & Chemicals Corporation, Cambridge, Mass., a
corporation of Delaware
No Drawing. Filed Apr. 16, 1964, Ser. No. 360,437
4 Claims. (Cl. 23—87)

The present invention relates to extraction processes and, more particularly to the production of beryllium chloride, from which beryllium metal may be reduced.

The present invention is a continuation-in-part of U.S. Patent No. 3,146,066, issued August 25, 1964, in the name of Ricardo O. Bach for Beryllium Ore Extraction Process.

In general, beryllium ores such as beryl, chrysoberyl and bertrandite are relatively inert minerals that can be attacked chemically only at elevated temperatures. Such minerals contain beryllium and aluminum compounds which, although chemically similar, must be chemically separated if beryllium is to be derived. Prior difficulties are illustrated by a typical extraction process involving the reaction of beryl with sodium silicofluoride at elevated temperature to produce reaction products including a beryllium fluoride complex and isolating the beryllium fluoride complex by leaching with water. Thereafter the beryllium fluoride complex in water solution is precipitated as a hydroxide, converted to an oxide and chlorinated. The resulting beryllium chloride is isolated as a gas and separated into its components by a known method such as electrolysis. (Copaux, "Methode de traitment du beryl pour en extraire la Glucine," Comptes Rendus, Acad. Sci., Paris, vol. 168, May 24, 1919, p. 610.)

The object of the present invention is the separation of beryllium from ore by an efficient process of unprecedented simplicity involving the production of beryllium chloride by reaction of the ore directly with silicon and chlorine. The silicon may be elemental, i.e., commercially available silicon, or alloyed, i.e., ferrosilicon. For best results, the process involves first sintering particulate beryllium ore and particulate silicon in a suitable binder to form briquettes or the like and then reacting with chlorine under particular reaction conditions.

Other objects of the present invention will in part be obvious and will in part appear hereinafter. For a fuller understanding of the nature and objects of the present invention reference is to be made to the following detailed disclosure.

Although the process of the present invention applies to the oxidic form of beryllium in all beryllium ores and compounds it is described below for simplicity in reference to beryl, $3BeO \cdot Al_2O_3 \cdot 6SiO_2$. The method of the present invention is based upon the following reaction:

$$3BeO \cdot Al_2O_3 \cdot 6SiO_2 + 6Cl_2 + 3Si \rightarrow 3BeCl_2 + 2AlCl_3 + 9SiO_2$$

In accordance with the present invention, at temperatures ranging from 800° to 1600° C. and preferably from 1100° to 1300° C., substantially only BeO and $Al_2O_3$ are chlorinated and volatilized and the residue essentially is $SiO_2$.

The significance of the foregiong reaction equation and temperature range will be illustrated by the following considerations. At 1200° C., the equilibrium constant for the reaction

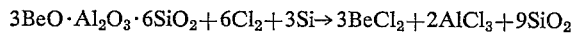

is equal to approximately $K_p=10^9$, i.e., very favorable, and the heat of reaction is approximately −50 kcal./mole. At that temperature, the reaction

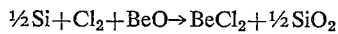

is similarly favored, and the heat of reaction is approximately −102 kcal. on the basis of the chlorination of one mole BeO. A heat balance indicates that the combined consumption of heat (heat content reactants plus heat content of gaseous products carried off) is approximately equal to the total heat of reaction at 1200° C. The reaction would be barely self-sustaining at 1200° C. because of the additional losses of radiation, conduction and convection. However, a carefully chosen excess of silicon and chlorine is capable of rendering the reaction self-sustaining without additional heat input. Accordingly, the ratio of silicon to beryl should be within the range 1:2 to 1:6.

Best results are achieved by sintering particulate beryllium ore and particulate silicon bearing material in a suitable binder to form briquettes or other compacted masses, reacting with chlorine under the above specified conditions, and isolating $BeCl_2$ by condensation. Preferably, the particulate silicon containing material ranges from 20 to 200 mesh, the particulate beryl is finer than 200 mesh, the binder is any silicon containing compound such as silicone grease and the sintering temperature ranges from 300° to 1000° C., preferably 500° to 600° C. In an alternative process embodying the invention, particulate silicon containing material and particulate beryllium ore are simply mixed in the foregoing proportions and subjected to a stream of chlorine at the foregoing temperature in order to produce beryllium chloride in the gaseous state form.

It has been found that the reaction yield, as an empirical matter, may be improved in the presence of an auxiliary salt which is an oxide, halide or carbonate of an alkali or alkaline earth metal, other than beryllium. Particularly effective for this purpose are salts of calcium, magnesium, sodium and mixtures thereof. Preferably the ratio of ore to auxiliary salt is within the range from 1:1 to 5:1.

The following non-limiting examples further illustrate the present invention:

Example 1

Pea sized briquettes of finely ground beryl ore (finer than 200 mesh) and finely ground silicon (finer than 200 mesh), compacted with silicone grease, were sintered at approximately 550° C. for approximately 60 minutes. The ratio of beryl to silicon was 9:3 and the ratio of beryl to silicone grease was 10:1. A quantity of these briquettes was placed in a vycor tube, and a slow stream of chlorine was passed through the tube. The region of the tube containing the briquettes was held at between 1285 and 1390° C. for 70 minutes. A white sublimate containing $BeCl_2$ formed on the cool portion of the tube. The total yield of $BeCl_2$ in terms of original BeO was 30%.

Example 2

7.5 g. of beryl ore and 2.5 g. of silicon, both finely ground (finer than 200 mesh) were heated for 60 minutes at 1285 to 1390° C. in a slow stream of chlorine. The total yield of $BeCl_2$ in terms of original BeO was 24%.

Example 3

The experiment of Example 2 was repeated except that finely ground $CaCl_2$ (finer than 200 mesh) was added to the mixture of beryl ore and silicon, the ratio of beryl ore to $CaCl_2$ being 4:1, a slight improvement in yield being noted and confirming theoretical expectation.

The present invention thus provides a process capable of isolating beryllium as the chloride from its ore with simplicity and efficiency. Since certain changes may be made in the above disclosure without departing from the scope of the invention herein, it is intended that all matter described above be interpreted in an illustrative and not in a limiting sense.

What is claimed is:

1. A process for producing the chloride of beryllium from an inorganic oxidic form of beryllium, said process comprising the steps of mixing said oxidic form of beryllium with a silicon material selected from the class consisting of elemental and alloyed silicon, the ratio of said oxidic form of beryllium to said silicon material ranging from 1:2 to 1:6, reacting the mixture of said oxidic form of beryllium and said silicon material with chlorine at a temperature ranging from 800 to 1600° C. to provide a reaction product including said chloride of beryllium.

2. A process for producing the chloride of beryllium from beryllium ore including an oxidic form of beryllium, said process comprising the steps of sintering a mixture of particulate beryllium ore and a silicon material to form compacted masses, said particulate beryllium ore being finer than 200 mesh, said silicon material being selected from the class consisting of elemental and alloyed silicon, reacting said mixture with chlorine at a temperature ranging from 800 to 1600° C. to produce a reaction product, said silicon material and said chlorine being in stoichiometric excess with respect to said oxidic form of beryllium, said reaction product including beryllium chloride and aluminum chloride, said beryllium chloride being in the gaseous state, and isolating said beryllium chloride from said reaction product in said gaseous state.

3. A process for producing the chloride of beryllium from beryl, said process comprising the steps of compacting particulate beryl, a particulate silicon material and a particulate salt in a suitable binder to form masses, said silicon material being selected from the class consisting of elemental and alloyed silicon, said salt being selected from the class consisting of oxides, halides and carbonates of alkali and alkaline earth metals other than beryllium, said particulate beryl being finer than 200 mesh, said particulate silicon material being finer than 200 mesh, sintering said masses at a temperature ranging between 300 to 1000° C. in order to form briquettes, the ratio of said oxidic form of beryllium to said silicon material ranging from 1:2 to 1:6, the ratio of said beryl to said salt ranging from 1:1 to 5:1, subjecting said briquettes to a stream of chlorine gas at a temperature ranging from 1100 to 1300° C. to produce a reaction product including chlorides of beryllium and aluminum and oxide of silicon, and isolating the chloride of beryllium in gaseous form from said reaction product.

4. The process of claim 3 wherein said binder is a silicone grease.

References Cited by the Examiner

UNITED STATES PATENTS

| 1,392,046 | 9/1921 | Booth et al. | 23—24.2 |
| 1,988,109 | 1/1935 | Bucher | 23—87 X |
| 2,789,880 | 4/1957 | Beaver | 23—93 X |
| 3,146,066 | 8/1964 | Bach | 23—87 |

OTHER REFERENCES

"Rare Metals Handbook," page 384, edited by C. A. Hampel, 1954 ed., Reinhold Pub. Corp., New York.

BENJAMIN HENKIN, *Primary Examiner.*

MAURICE A. BRINDISI, *Examiner.*